Dec. 16, 1924.

J. H. J. AYSCUE

SPRAYING MACHINE

Filed May 16, 1923

WITNESSES
R. E. Rousseau
J. T. Schrott

INVENTOR
J. H. J. Ayscue,
BY
ATTORNEYS

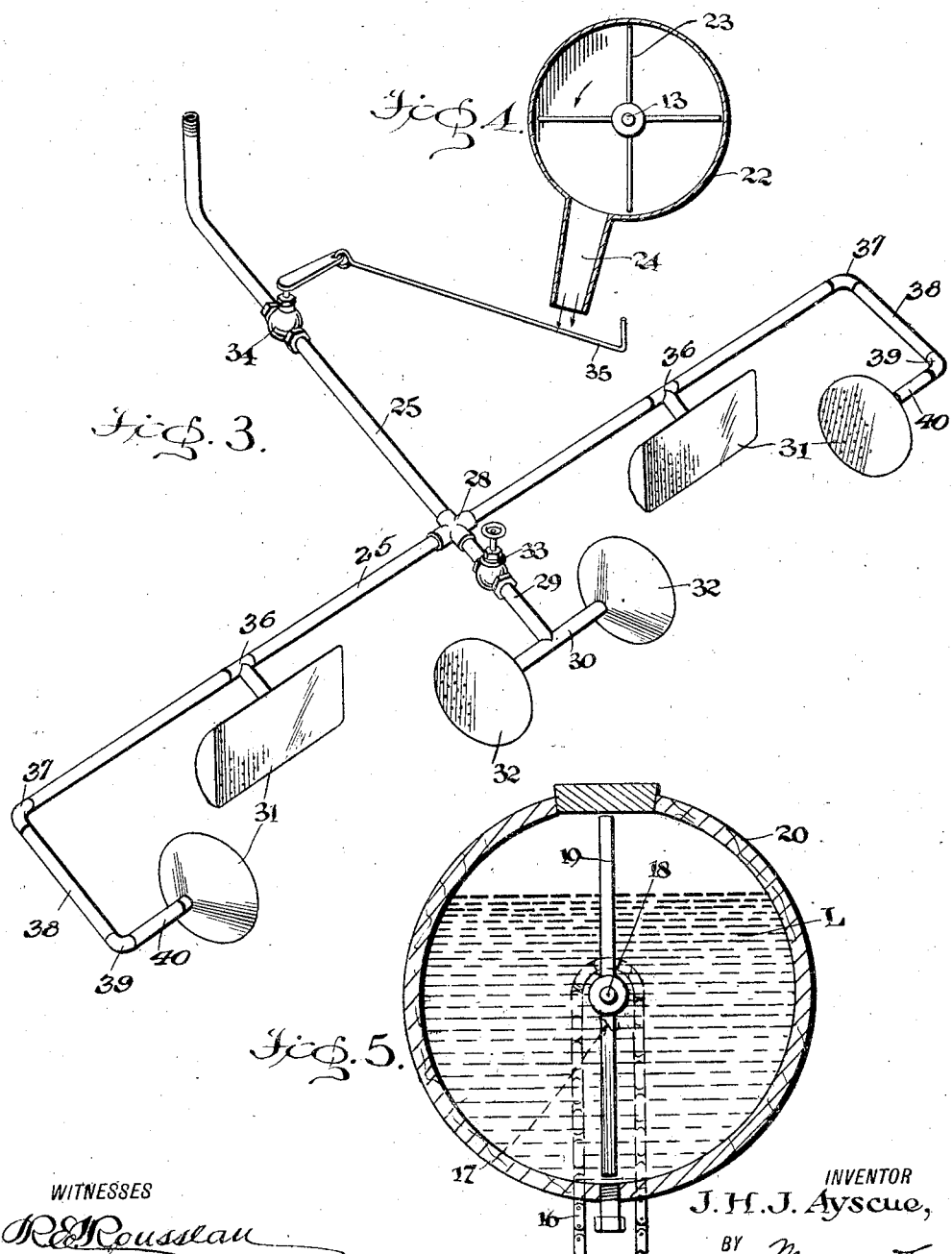

Patented Dec. 16, 1924.

1,519,103

UNITED STATES PATENT OFFICE.

JOHN H. J. AYSCUE, OF MOUNT PLEASANT, SOUTH CAROLINA.

SPRAYING MACHINE.

Application filed May 16, 1923. Serial No. 639,433.

*To all whom it may concern:*

Be it known that I, JOHN H. J. AYSCUE, a citizen of the United States, and a resident of Mount Pleasant, in the county of Charleston and State of South Carolina, have invented certain new and useful Improvements in Spraying Machines, of which the following is a specification.

My invention relates to improvements in spraying machines and it consists of the constructions, combinations and arrangements herein described and claimed.

An object of the invention is to provide a machine for spraying a suitable poisonous liquid upon cotton plants for killing boll weevils.

A further object of the invention is to provide a spraying machine having sets of sprayers arranged to spray the liquid both at the sides and tops of cotton plants in more than one row at a time.

A further object of the invention is to provide a spraying machine comprising a sulky upon which the spraying apparatus is mounted the sulky being adapted to be driven over the rows of cotton plants, the spraying apparatus being so arranged as to reach the plants in more than one row at a time.

Other objects and advantages will appear in the following specification, reference being had to the accompanying drawings, in which:

Fig. 3 is a detail perspective view of the spray head,

Fig. 4 is a detail cross section of one of the blowers taken substantially on the line 4—4 of Fig. 1, and Fig. 5 is a detail section of the liquid cask, taken substantially on the line 5—5 of Fig. 1 and showing the agitators inside.

Figure 1:
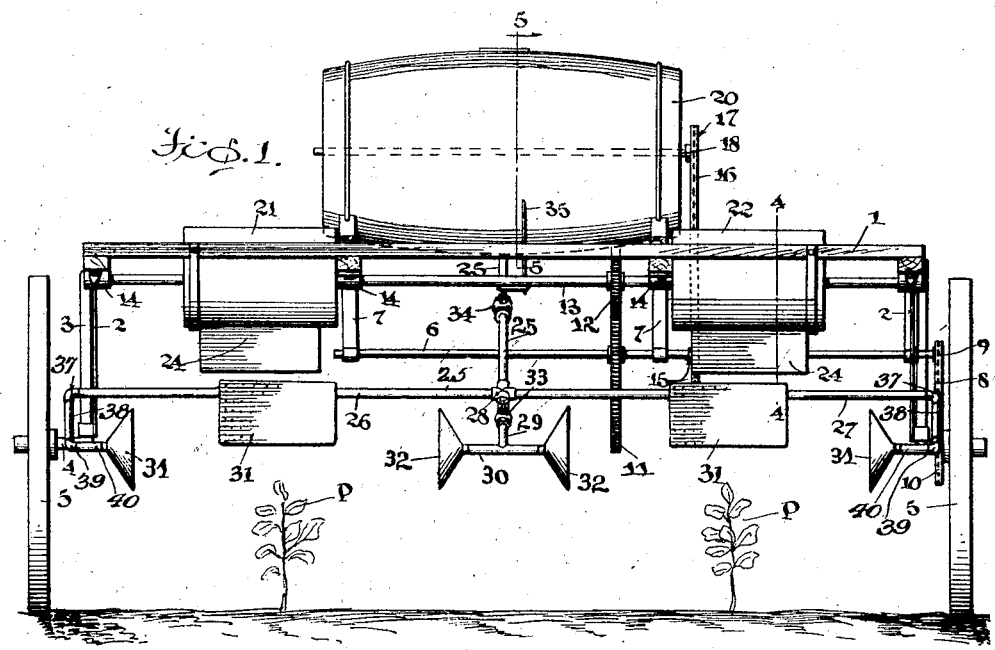
Fig. 1 is a rear elevation of the improved spraying machine.

In carrying out the invention, provision is made of a sulky upon which the spraying apparatus is mounted and upon which it is transported over the fields of cotton plants. The sulky comprises a frame 1 which includes pendent bearing straps 2 which engage the downwardly bent portions of a bar 3 in such a manner as to hold this bar steady. The downwardly bent portions of this bar are bent outwardly and provide axles 4 upon which the sulky wheels 5 are journalled.

A countershaft 6, journalled on hangers 7 which are pendent from the frame 1, is driven by a chain 8 which is applied to sprockets 9 and 10 on the countershaft 6 and attached to the hub of one of the wheels 5. The countershaft 6 carries a large spur gear 11 which meshes with a smaller gear 12 on a blower shaft 13. This shaft is supported by bearings 14.

The countershaft 6 also carries a sprocket 15 which drives a chain 16. This chain is applied to a sprocket 17 on the shaft 18 of a plurality of agitators 19 in a cask 20. Preferably there are two agitators opposite each other and suitably perforated to aid in mixing the liquid. The agitators are adapted to stir the liquid L (Fig. 5) so as to keep any constituents which are likely to settle at the bottom in suspension. Referring again to the shaft 13, it is to be observed that this shaft extends through a pair of blower cases 21 and 22 (Fig. 1). In each of these casings there is a blower 23 as shown for example in Fig. 4.

Figure 2:
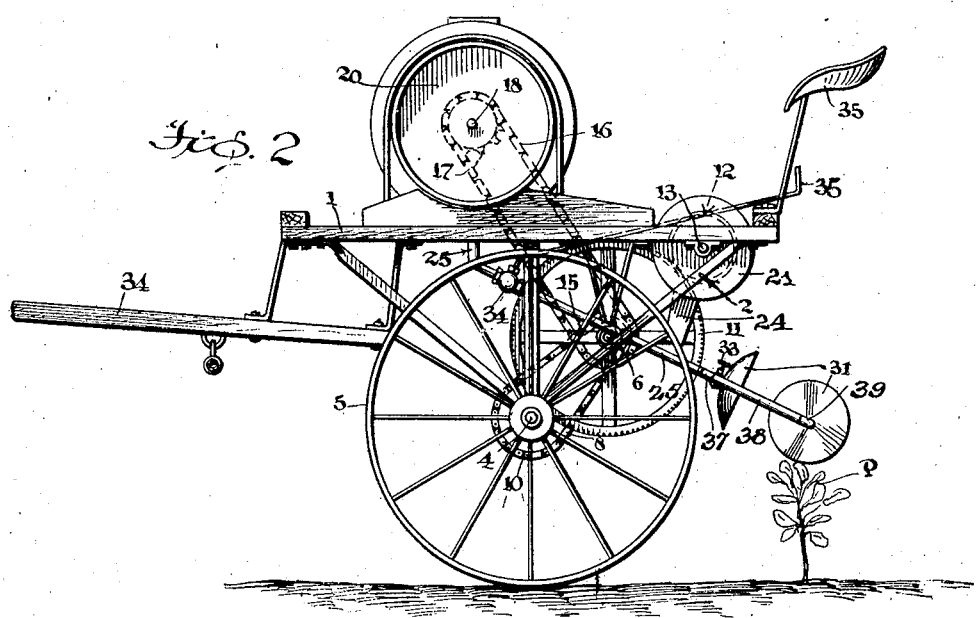
Fig. 2 is a side elevation.

A downwardly directed nozzle 24 from each blower casing causes the air to be directed toward the plant. It is to be observed that the gear 12 (Fig. 2) is smaller than the driving gear 11. This particular arrangement is for the purpose of gaining speed of rotation at the blowers. In actual practice, the ratio between the gears 11 and 12 may be even greater than suggested by the drawings so that the blowers may be made to move correspondingly faster. The blower casings 21 and 22 are supported upon the frame 1 in any suitable manner.

Connecting with the bottom of the cask 20 is a main spray pipe 25 which has communication with laterals 26 and 27 at a 4-way connection 28. A pipe 29 is screwed into the remaining outlet of this connection. The pipe 29 is practically a continuation of the main spray pipe 25. It, like the pipe 25, has a lateral 30. The laterals of the main spray pipe 25 and extension pipe 29 have spray cups 31 and 32 which are severally so positioned as to insure applying the poisonous liquid well on top and at the sides of the plants P over which the machine is driven. Those of the spray cups on the front line are round but those in the rear are oblong so as to more readily cover the tops of the plants. All of the spray cups are adjustable to any desired angle.

It is to be observed in Fig. 3 that the various spray cups are arranged in two sets in such a manner that the plants in two rows of cotton can be treated at one time (see Fig. 1). Circumstances might arise when it might not be desired to permit the escape of liquid at the inner spray cups 32. For this purpose, the extension pipe 29 is fitted with a globe valve 33 by means of which the flow of liquid to these particular cups is cut off. A valve 34 in the pipe 25 permits cutting off the flow of liquid from the cask. This valve is controlled by a connection 35 which is within reach of the operator.

The sulky is adapted to be drawn by horses, a draw bar 34 (Fig. 2) being provided for the purpose. A seat 35 is provided for the driver, this seat being shown in Fig. 2, but the showing thereof being omitted in Fig. 1. The operation of the sprayer is doubtless quite obvious from the foregoing description and from the drawings. However, a brief review may be of advantage.

The sulky is drawn over the cotton plants P, the wheels 5 being far enough apart to permit reaching the plants in two rows at one time. The spray head in Figs. 1 and 3 is also arranged to carry out this purpose. The spray cups 31 and 32 are arranged in two sets and are disposed to face each other in the manner shown so that the liquid may be applied to the plants substantially from the top (Fig. 2) and from the lateral sides.

As the spraying machine progresses along the cotton rows, the blowers 23 in the casings 21 and 22 are driven at a high rate of speed and blasts of air are discharged at the nozzles 24 upon the plant in advance of the spray head. These blasts of air serve to spread the enfolding leaves of the cotton form and young bolls so that the liquid may penetrate more deeply when reached by the spray head. As has been mentioned before, the communication of the liquid with the inner spray cups 32 may be cut off by closing the valve 33 (Fig. 3). The supply of liquid L (Fig. 5) is replenished by removing the plug at the top of the cask and pouring in a fresh supply.

Reference is again made to Fig. 3. It is to be observed that the spray cups 31, respectively situated along the back of the pipe 25 and at the confronting ends, are mounted by means of fittings 36 and 37. The latter are elbows which join the long back pipe 25 with the shorter ends 38. These in turn are connected, by means of elbows 39, with the short pipes 40 which carry the aforesaid confronting cups.

The purpose of this arrangement of fittings is to provide considerable latitude for adjustment. The cups 31 may be adjusted at any desired angle, either singly or collectively. The object of this is to insure that the spray will reach any desired part of the plants.

While the construction and arrangement of the improved spraying machine as herein described and claimed, is that of a generally preferred form, obviously modifications and changes may be made without departing from the spirit of the invention or the scope of the claims.

I claim:—

1. A spraying machine comprising a frame, wheels upon which the frame is mounted including axles upon which the wheels turn, a counter shaft, means by which the counter shaft is turned from one of the axles, a cask mounted on the frame, agitating means in the cask, means by which the agitating means is operated from the counter shaft, a spray head including a spray pipe in communication with the cask and spray cups carried by the pipe for applying the liquid to plants as the machine is drawn thereover, a blower shaft mounted on the frame, means by which the blower shaft is driven from the counter shaft, blower casings through which the blower shaft extends the shaft having blowers mounted thereon in said casing, and a blower nozzle extending from each casing in advance of the spray head the blasts of air being adapted to open the bush to permit a thorough penetration of the sprayed liquid.

2. A spraying machine comprising a wheeled frame, a liquid supply cask, sets of sprayers comprising horizontally elongated spray heads situated crosswise of the frame and circular spray heads in opposing pairs for each elongated spray head, piping to both support the various spray heads and conduct the liquid thereto, and blower means discharging in advance of each set of sprayers to open the enfolding leaves to receive the spray.

JOHN H. J. AYSCUE.